United States Patent [19]

McClure

[11] 4,185,593
[45] Jan. 29, 1980

[54] TRANSFORMATION OF ELECTRICAL ENERGY TO PHYSICAL ENERGY

[76] Inventor: Kenneth S. McClure, Rte. 1, Thayer, Kans. 66776

[21] Appl. No.: 571,975

[22] Filed: Oct. 31, 1977

[51] Int. Cl.² ............................................. F02B 43/08
[52] U.S. Cl. ...................................... 123/1 A; 123/3; 123/25 B; 123/25 D; 123/119 E; 123/DIG. 12
[58] Field of Search ................. 123/1 A, 3, DIG. 12, 123/119 E, 25 B, 25 C, 25 D; 60/39.55

[56] References Cited

U.S. PATENT DOCUMENTS

| | | | |
|---|---|---|---|
| 2,780,602 | 2/1957 | Berkman | 123/191 A |
| 3,318,293 | 5/1967 | Hickling et al. | 123/119 E |
| 3,381,675 | 5/1968 | Schiavone | 123/193 H |
| 3,444,098 | 5/1969 | Bottazi et al. | 123/191 A |
| 3,648,668 | 3/1972 | Pacheco | 123/1 A |
| 3,921,985 | 11/1975 | Fimml | 123/119 E |
| 3,939,806 | 2/1976 | Bradley | 123/DIG. 12 |
| 4,009,006 | 2/1977 | Hreha | 123/3 |
| 4,031,865 | 6/1977 | Dufour | 123/1 A |
| 4,052,139 | 10/1977 | Paillaud et al. | 123/1 A |

*Primary Examiner*—Charles J. Myhre
*Assistant Examiner*—Craig R. Feinberg
*Attorney, Agent, or Firm*—John H. Widdowson

[57] ABSTRACT

An improved means and process for providing for the removal of hydrogen from a catalytic cathode means whereby the hydrogen may be recombined with oxygen to provide explosive force to power an internal combustion engine.

13 Claims, 4 Drawing Figures

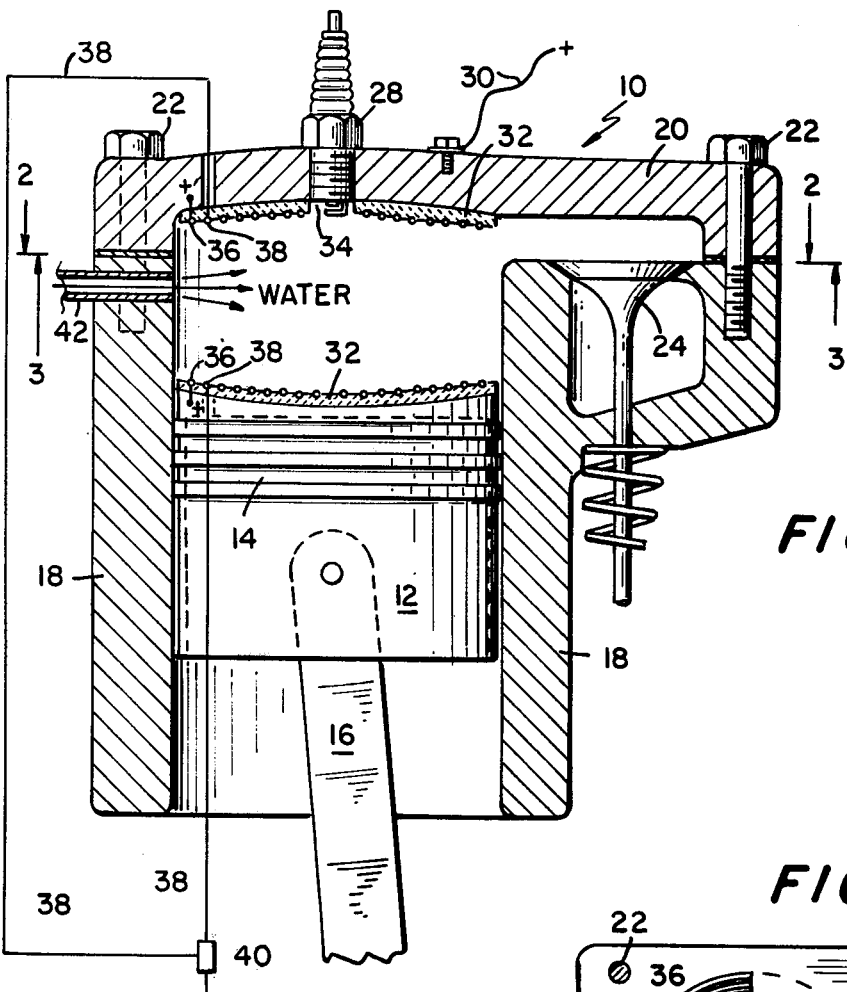
FIG. 1
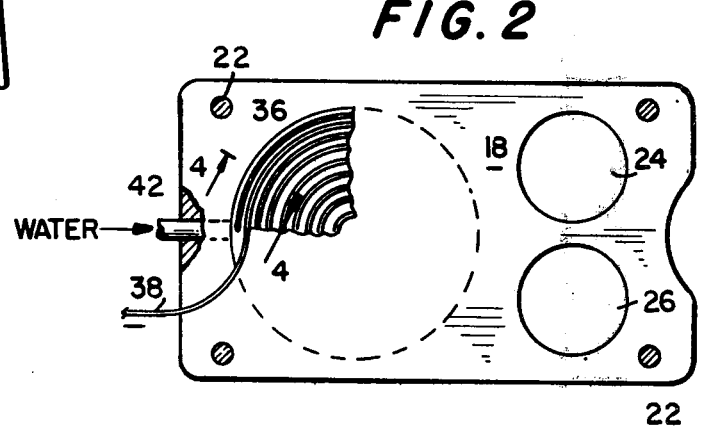
FIG. 2
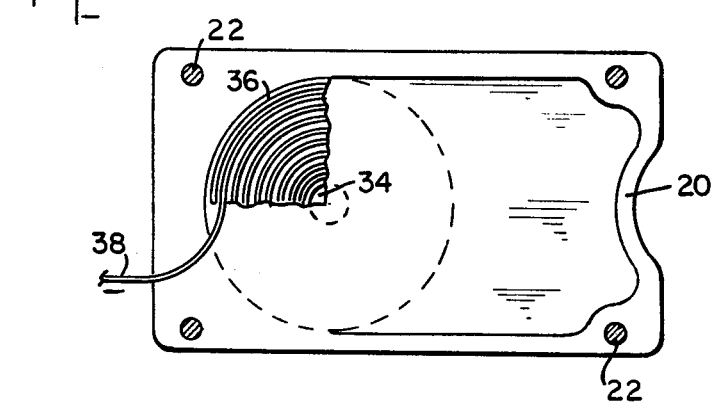
FIG. 4
FIG. 3

TRANSFORMATION OF ELECTRICAL ENERGY TO PHYSICAL ENERGY

BACKGROUND OF THE INVENTION

1. Field of the Invention

This invention is related to the transformation of electrical energy to physical energy. More particularly, this invention provides an improved means and process for providing for the removal of hydrogen from a palladium conductor to mix with oxygen to provide explosive force to power an internal combustion engine.

2. Description of the Prior Art

U.S. Pat. No. 3,248,871, May 3, 1966, and U.S. Pat. No. 3,256,686, June 21, 1966, to J. E. Lindberg, Jr., teach ingassing (taking in gas in either a chemical or physical action) or degassing (also called "out-gassing") upon the application or removal of heat to effect expansion within a confined area against a movable face to activate the following devices, which are capable of applying mechanical force: hydraulic systems, gas turbines, loudspeakers, and valve actuators. None of these patents or any other art teach the improved transformation of electrical to physical energy which is the subject of this application for patent.

SUMMARY OF THE INVENTION

It is therefore an object of this invention to provide an improved means and process for the transformation of electrical energy to physical energy.

It is another object of this invention to provide an improved means and process for providing for the removal of hydrogen from a catalytic cathode means.

It is yet another object of this invention to provide an improved means and economical process for providing for the removal of hydrogen from a palladium conductor to mix with oxygen to provide explosive force to power an internal combustion engine.

Still other objects will be apparent to those skilled in the art from the following description of this invention.

The foregoing objects are achieved according to the practice of this invention. Broadly, this invention provides an improved means and process for providing for the removal of hydrogen from a catalytic cathode means whereby the hydrogen may be recombined with oxygen to provide explosive force to power an internal combustion engine. Water is sprayed into a housing zone at a temperature below about 100° C. and at a pressure below about 14.7 psia; the housing zone includes the catalytic cathode means and a catalytic anode means spacedly juxtaposed thereto. Insulation means is positioned between the catalytic cathode means and the catalytic anode means, and the cathode means and the anode means are electrified. The water bridges the space between the cathode means and the anode means such that electrolytic decomposition of the water is initiated by the electrification. The improved means and process also provides for forming a hydrogen surface film and interstitial hydrogen in and on the catalytic cathode means by the cathode and anode means being electrified and associated with the water. Molecular hydrogen is expelled by purging the hydrogen surface film on the cathode means and the interstitial hydrogen dissolved in the cathode means. Purging results from the raising of the temperature of the cathode means to above about 250° C.

These, together with various ancillary objects and features which will become apparent to those artisans possessing ordinary skill in the art and as the following description proceeds are attained by this novel transformation of electrical energy to physical energy, a preferred embodiment shown in the accompanying drawings, by way of example only, wherein:

BRIEF DESCRIPTION OF THE DRAWINGS

FIG. 1 is a vertical sectional view of a head assembly of an internal combustion engine showing a preferred embodiment of the invention.

FIG. 2 is a horizontal sectional view taken along the plane of line 2—2 in FIG. 1.

FIG. 3 is a horizontal sectional view taken along the plane of line 3—3 in FIG. 1.

FIG. 4 is a fragmentary vertical sectional view taken along the plane of line 4—4 in FIG. 2.

DETAILED DESCRIPTION OF THE INVENTION

Referencing the drawings wherein identical reference numerals represent similar parts of the invention, there is seen a head assembly, generally illustrated as 10, of an internal combustion engine (not shown in the drawings), having a piston 12 with compressor seal rings 14 and a crank shaft 16 attached thereto. Piston 12 is slidably positioned within the lower part 18 of the head assembly 10 which also has an upper part 20 connecting to the lower part 18 by bolts 22. Head assembly 10 additionally includes an intake valve 24 and an exhaust valve 26 along with an ignition plug 28 and ground wire 30. An insulation means 32, which is preferably a ceramic material or the like, is attached to the top of piston 12 and to the upper part 20 which includes an aperture 34 for the ignition plug 28. A catalytic anode means 36, preferably a silver conductor, and a catalytic cathode means 38, which is a preferred embodiment of the invention is a palladium conductor, have a source of electricity (not shown in the drawings) and are spirally wound (as shown in FIGS. 2 and 3) and attached to the insulation 32. The cathode 38, leading from the insulation 32 which is attached to upper part 20, connects with the cathode 38 leading from the insulation 32 that is connected to the piston 12 via a sliding brush contact 40. Head assembly 10 also comprises a basified water conduit 42 which is in communication with a basified water source (not shown in the drawings). The anode 36 and the cathode 38 are spacedly juxtaposed, as shown in FIG. 4, such that the basified water can bridge the space therebetween and electrolytic decomposition of the basified water is initiated by the electrification of the anode 36 and the cathode 38, and a hydrogen surface film and interstitial hydrogen is formed in and on the cathode 38. A means for raising the temperature of the cathode 38 above about 250° C. is, in a preferred embodiment of the invention, the compression stroke of the piston 12 which causes an adiabatic temperature rise within the space above the top of piston 12 and beneath the upper part 20 and purges molecular hydrogen from the cathode 38.

With continued reference to the drawings for operation of the invention, cool air at a pressure below about 14.7 psia is drawn through intake valve 24 and cools the silver 36/palladium 38/ceramic 32 gridwork to a temperature below about 100° C. The ceramic 32 (or other suitable isulating base) controls the palladium distortion normally associated with palladium-hydrogen absorption-desorption cycling. Hydrogen peroxide treated distilled water is sprayed through conduit 42 onto the electrified silver 36/palladium 38/ceramic 32 gridwork such that the water bridges the space between the silver 36 and palladium 38 and catalyzed electrolytic decomposition of the basified water is initiated, and a hydrogen surface film and interstitial hydrogen is formed on and in, respectively, the palladium 38. When piston 12 starts upward, adiabatic compression commences and the temperature within the head assembly 10 increases from below 100° C. to above about 250° C. This temperature rise purges the hydrogen surface film on the palladium 38 and the interstitial hydrogen dissolved in the palladium 38. Residual basified water on the silver 36/palladium 38/ceramic 32 gridwork is converted to steam which terminates the current flow on the electrified gridwork. A compression ratio of at least 8:1 (yielding a pressure within the head assembly of at least 117.6 psia) would be sufficient to increase the temperature from below about 100° C. to above about 250° C. and purge molecular hydrogen from the palladium 38.

The expelled molecular hydrogen combines with the oxygen available in the compressed air and is capable of being ignited by ignition plug 28 to provide an explosive violence at a head assembly 10 temperature above about 250° C. In a preferred embodiment, the temperature of the head assembly is somewhat above 400° C. An internal combustion engine of higher compression ratio would provide sufficient temperature on adiabatic compression to cause the released hydrogen to ignite in the presence of air at 600° C. and eliminate the need for ignition plug 28. Superheated steam is removed from the head assembly 10 via exhaust valve 26 for further utilization as an energy source.

I claim:

1. A process for providing for the removal of hydrogen from a catalytic cathode means whereby the hydrogen may be recombined with oxygen to provide explosive force to power an internal combustion engine which comprises:
    (a) spraying water into a combustion chamber of an engine at a temperature below about 100° C. and a pressure below about 14.7 psia, a combustion chamber containing a catalytic cathode means and a catalytic anode means spacedly juxtaposed thereto, insulation means positioned between said catalytic cathode means and said catalytic anode means, said cathode means and said anode means being electrified, said water bridging the space between said cathode means and said anode means such that electrolytic decomposition of the water is initiated by said electrification;
    (b) forming a hydrogen surface film and interstitial hydrogen in and on said catalytic cathode means by said cathode means and said anode means being electrified and associated with said water; and
    (c) purging said hydrogen surface film on said cathode means and said interstitial hydrogen dissolved in said cathode means by raising the temperature of said cathode means to above about 250° C., said purging being in the form of expelled molecular hydrogen which mixes with said available oxygen.

2. The process of claim 1, additionally including providing an electrical spark means to ignite said mixture of oxygen and hydrogen with explosive violence.

3. The process of claim 2, additionally including increasing the pressure of said catalytic cathode means to about 117.6 psia to vaporize residual water into steam and stop the current flow between said cathode means and said anode means.

4. The process of claim 3, wherein said increasing is simultaneous to said purging step (c).

5. The process of claim 3, additionally including purging from said combustion chamber said steam for further utilization as an energy source.

6. The process of claim 3, additionally including spirally positioning with respect to a horizontal plane said cathode means and said anode means within said combustion chamber.

7. The process of claim 6, wherein said cathode means is palladium wire, said anode means is silver wire, and said insulation is ceramic.

8. An improved means for providing explosive force to power an internal combustion engine having a head assembly, a piston slidably situated within said head assembly, an intake and exhaust valve positioned in said head assembly and in communication with the top of the piston, the improvement comprising:
    (a) an insulation means;
    (b) a catalytic cathode means and a catalytic anode means spacedly juxtaposed to said cathode means, said cathode and anode means being attached to said insulation means and positioned within said head assembly in the space above said piston and on top of said piston;
    (c) a means for electrifying said cathode and anode means;
    (d) a means for spraying water onto said cathode and anode means such that said water bridges the space between said cathode and anode means and electrolytic decomposition of the water is initiated by said electrification and a hydrogen surface film and interstitial hydrogen is formed in and on said cathode means; and
    (e) a means for raising the temperature of the cathode means to above about 250° C. to purge the hydrogen surface film on the cathode means and the interstitial hydrogen dissolved in the cathode means such as to expell molecular hydrogen which mixes with available oxygen to be capable of exploding to provide explosive force to power the internal combustion engine.

9. The improved means of claim 8, additionally including an electrical spark means attached to said head assembly to ignite the mixture of oxygen and hydrogen with explosive violence.

10. The improved means of claim 8 wherein said cathode means and said anode means are spirally wound to said insulation means.

11. The improved means of claim 10 wherein said insulation means is a ceramic material and is positioned to the top of said piston, said cathode means is a palladium wire and extends through the piston, said anode means is a silver wire and is grounded to said piston.

12. The improved means of claim 11, wherein a second ceramic material is attached to the head assembly in the space having communication with said intake and said exhaust valves, said second ceramic material includes a second silver wire and a second palladium wire spirally situated thereto and spacedly juxtaposed such that water can bridge between the second silver wire and the second palladium wire, said second silver wire is grounded to the head assembly, and said second palladium wire extends through the head assembly, and a sliding brush contact interconnects the second palladium wire with the palladium wire that extends through said piston.

13. The improved means of claim 12, wherein said second ceramic material has a structure defining an aperture, an electrical spark means extends through said aperture and is attached to said head assembly, said spark means ignites the mixture of oxygen and hydrogen with explosive violence.

* * * * *